(12) United States Patent
Makh et al.

(10) Patent No.: US 9,668,191 B2
(45) Date of Patent: May 30, 2017

(54) METHODS AND APPARATUSES FOR SAVING USER EQUIPMENT POWER BY SEARCH LENGTH REDUCTION

(71) Applicant: QUALCOMM Incorporated, San Diego, CA (US)

(72) Inventors: Vansh Pal Singh Makh, Mountain View, CA (US); An-swol C. Hu, Belmont, CA (US); Jittra Jootar, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 13/745,515

(22) Filed: Jan. 18, 2013

(65) Prior Publication Data

US 2013/0331106 A1 Dec. 12, 2013

Related U.S. Application Data

(60) Provisional application No. 61/658,219, filed on Jun. 11, 2012.

(51) Int. Cl.
*H04W 36/32* (2009.01)
*H04W 36/00* (2009.01)
*H04B 1/7083* (2011.01)

(52) U.S. Cl.
CPC ....... *H04W 36/32* (2013.01); *H04W 36/0094* (2013.01); *H04B 1/7083* (2013.01)

(58) Field of Classification Search
CPC . H04W 36/32; H04W 36/0094; H04W 48/16; H04B 1/7083
See application file for complete search history.

(56) References Cited

U.S. PATENT DOCUMENTS 6,067,460 A 5/2000 Alanara et al.
6,215,827 B1 * 4/2001 Balachandran ....... H04L 1/0003
375/262

(Continued)

FOREIGN PATENT DOCUMENTS

EP 2124497 A1 * 11/2009 ............ H04W 36/30
EP 2124497 A1 11/2009

(Continued)

OTHER PUBLICATIONS

International Search Report and Written Opinion—PCT/US2013/044740—ISA/EPO—Nov. 21, 2013.

(Continued)

*Primary Examiner* — Mehmood B Khan
(74) *Attorney, Agent, or Firm* — François A. Pelaez

(57) ABSTRACT

The present disclosure presents example methods and apparatuses for improved cell searching in a wireless communications environment. For example, the disclosure presents example methods that can include computing a predicted serving signal strength associated with a serving cell where a mobility state of a user equipment is one of a stationary state or a low mobility state. Furthermore, in an aspect, the example method can include ascertaining a search threshold based at least on the predicted serving signal strength and generating a search integration length based on at least the search threshold. In addition, some example methods may include scanning for one or more reselection candidate cells based on at least the search integration length, wherein each of the one or more reselection candidate cells has a cell signal strength greater than the search threshold.

32 Claims, 9 Drawing Sheets

(56) References Cited

U.S. PATENT DOCUMENTS

| | | | | |
|---|---|---|---|---|
| 6,466,606 B1* | 10/2002 | Jou | ................. | H04B 1/70754 375/130 |
| 8,089,939 B1 | 1/2012 | Mater et al. | | |
| 2002/0082012 A1* | 6/2002 | Wang | ................. | H04W 36/32 455/436 |
| 2004/0038658 A1* | 2/2004 | Gurelli | ................. | H04L 1/0002 455/226.3 |
| 2004/0196183 A1* | 10/2004 | Roh | ................. | G01S 19/21 342/357.25 |
| 2004/0252656 A1 | 12/2004 | Shiu et al. | | |
| 2005/0099334 A1* | 5/2005 | Roh | ................. | G01S 19/09 342/357.59 |
| 2006/0258386 A1 | 11/2006 | Jeong et al. | | |
| 2007/0064646 A1* | 3/2007 | Esteves | ................. | H04W 28/18 370/329 |
| 2008/0004062 A1* | 1/2008 | Nibe | ................. | H04W 28/22 455/519 |
| 2008/0279093 A1* | 11/2008 | Hassan | ................. | H04L 1/0002 370/216 |
| 2010/0202316 A1* | 8/2010 | Terasawa | ................. | H04B 1/70735 370/252 |
| 2011/0319080 A1 | 12/2011 | Bienas et al. | | |
| 2013/0137450 A1* | 5/2013 | Dai | ................. | H04W 4/043 455/456.1 |
| 2014/0045535 A1* | 2/2014 | Dai | ................. | H04W 4/043 455/456.3 |
| 2015/0016561 A1* | 1/2015 | Negus | ................. | H04W 24/02 375/267 |

FOREIGN PATENT DOCUMENTS

| | | | | |
|---|---|---|---|---|
| EP | | 2187671 A1 | 5/2010 | |
| EP | | 2 485 516 A1 | 8/2012 | |
| JP | | EP 2124497 A1 * | 11/2009 | .......... H04J 11/0086 |
| WO | WO 2007/025151 A2 | | 8/2006 | |

OTHER PUBLICATIONS

Liu H., et al., "Energy Efficient Network Selection and Seamless Handovers in Mixed Networks", World of Wireless, Mobile and Multimedia Networks&Workshops, 2009. WOWMOM 2009. IEEE International Symposium, IEEE, Piscataway, NJ, USA, Jun. 15, 2009 (Jun. 15, 2009), pp. 1-9, XP031543635, ISBN: 978-1-4244-4440-3.

* cited by examiner

METHODS AND APPARATUSES FOR SAVING USER EQUIPMENT POWER BY SEARCH LENGTH REDUCTION

CLAIM OF PRIORITY UNDER 35 U.S.C. §119

The present Application for Patent claims priority to Provisional Application No. 61/658,219 filed Jun. 11, 2012, entitled "Methods and Apparatuses for Saving User Equipment Power by Search Length Reduction," which is assigned to the assignee hereof, and hereby expressly incorporated by reference herein.

BACKGROUND

Field

Aspects of the present disclosure relate generally to wireless communication systems, and more particularly, to optimizing search length for reselection cell searches.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In UMTS networks, mobile devices, such as user equipment (UE), may intermittently search for cells other than the cell currently serving the UE to determine whether one or more candidate cells exist that would provide more reliable or stronger service than the current serving cell. Currently, when in idle mode, when the signal strength of the serving cell is less than a threshold signal strength value, the UE may trigger a full search for these candidate cells, for example. This full search may include a step 1 search, which may include a full search subset, such as, but not limited to, a step 1 search, step 2 search, step 3 search, or any other search type described by specifications disseminated by the Third Generation Partnership Project (3GPP). In an aspect, a full search, or a portion of a full search, such as a step 1, 2, 3, or other search subset of a full search, may have a non-coherent integration length that may be, or may not be, related to the coherent integration length. For purposes of the present disclosure, the term "coherent integration" may refer to a process whereby a received signal is correlated with a known signal sequence, such as a signal sequence stored on memory or otherwise obtained and known by a UE. Further, for purposes of the present disclosure, the term "coherent integration length" may refer to a number of samples over which correlation takes place. Additionally, for purposes of the present disclosure, the term "non-coherent integration" may refer to a process wherein the energies from multiple coherent integrations (e.g. correlations) are added together. Furthermore, for purposes of the present disclosure, the term "non-coherent integration length" may refer to the number of coherent integration energies are added up during a particular non-coherent integration process.

Furthermore, in an aspect, following completion of the step 1 search in a full search, the UE may perform a step 2 and/or a step 3 search, which each extend the total full search time and demand additional power resources. Implementing such a full search whenever a candidate cell search is triggered consumes non-negligible amounts of power and sometimes impacts standby time significantly. Therefore, methods and apparatuses are needed for improving cell reselection candidate searching processes in wireless systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure presents example methods of wireless communication, which may include computing a predicted serving signal strength associated with a serving cell where a mobility state of a user equipment is one of a stationary state or a low mobility state. Such example methods may also include ascertaining a search threshold based at least on the predicted serving signal strength, generating a search integration length based on at least the search threshold, and scanning for one or more reselection candidate cells based on at least the search integration length, wherein each of the one or more reselection candidate cells has a cell signal strength greater than the search threshold.

Furthermore, the present disclosure presents example apparatuses for wireless communication, which may include at least one processor and a memory coupled to the at least one processor. In some examples, the at least one processor is configured to compute a predicted serving signal strength associated with a serving cell where a mobility state of a user equipment is one of a stationary state or a low mobility state. Further, in an aspect, the at least one processor may be configured to ascertain a search threshold based at least on the predicted serving signal strength, generate a search integration length based on at least the search threshold, and scan for one or more reselection candidate cells based on at least the search integration length, wherein each of the one or more reselection candidate cells has a cell signal strength greater than the search threshold.

Moreover, the present disclosure presents example computer-readable media, which may store executable code for computing a predicted serving signal strength associated with a serving cell where a mobility state of a user equipment is one of a stationary state or a low mobility state. Furthermore, such example computer-readable media may store executable code for ascertaining a search threshold based at least on the predicted serving signal strength, for generating a search integration length based on at least the search threshold, and for scanning for one or more reselection candidate cells based on at least the search integration length, wherein each of the one or more reselection candidate cells has a cell signal strength greater than the search threshold.

In additional or alternative examples, the present disclosure presents example apparatuses for wireless communication, which may include one or more of means for computing a predicted serving signal strength associated with a serving cell where a mobility state of a user equipment is one of a stationary state or a low mobility state, means for ascertaining a search threshold based at least on the predicted serving signal strength, means for generating a search integration length based on at least the search threshold, and means for scanning for one or more reselection candidate cells based on at least the search integration length, wherein each of the one or more reselection candidate cells has a cell signal strength greater than the search threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

According to aspects of the present disclosure, an improved method of improving scanning for reselection candidates is provided. For example, to intelligently find possible reselection candidate cells, the UE may determine how strong or how weak the serving cell may become in the near future based on historical analysis of past signal strength data. This determination may govern how thorough the UE full search should be in order to detect and possibly reselect a cell that may exhibit stronger signal characteristics than the current serving cell. For example, any cells that exhibit a signal strength, e.g. a pilot signal strength, much weaker than the serving cell have little to no chance of becoming reselection candidates in the near future. Thus, the UE, in an aspect, does not search for these cells. Furthermore, since in stationary or low mobility scenarios the signal strength of the serving cell and neighbors is not expected to vary a significant amount, the recent past can be a good predictor of how the signal strength of a cell will behave in the near future.

Thus, according to aspects of the present disclosure, a UE may use historical signal strength data of a serving cell and neighbor cells to narrow a list of candidate cells for which to search while in a stationary or low mobility state. For example, the UE may determine whether it is in a stationary or low mobility state—and if in a stationary or low mobility state, may use historical signal strength data of the serving cell to compute a threshold for which neighbor cell signal strength must be likely to exceed to be considered for searching. This threshold may then be mapped to a non-coherent or coherent integration length associated with the search and the search for candidate cells may be performed. As such, the time period and power required for candidate cell searching may be reduced.

Figure 1:
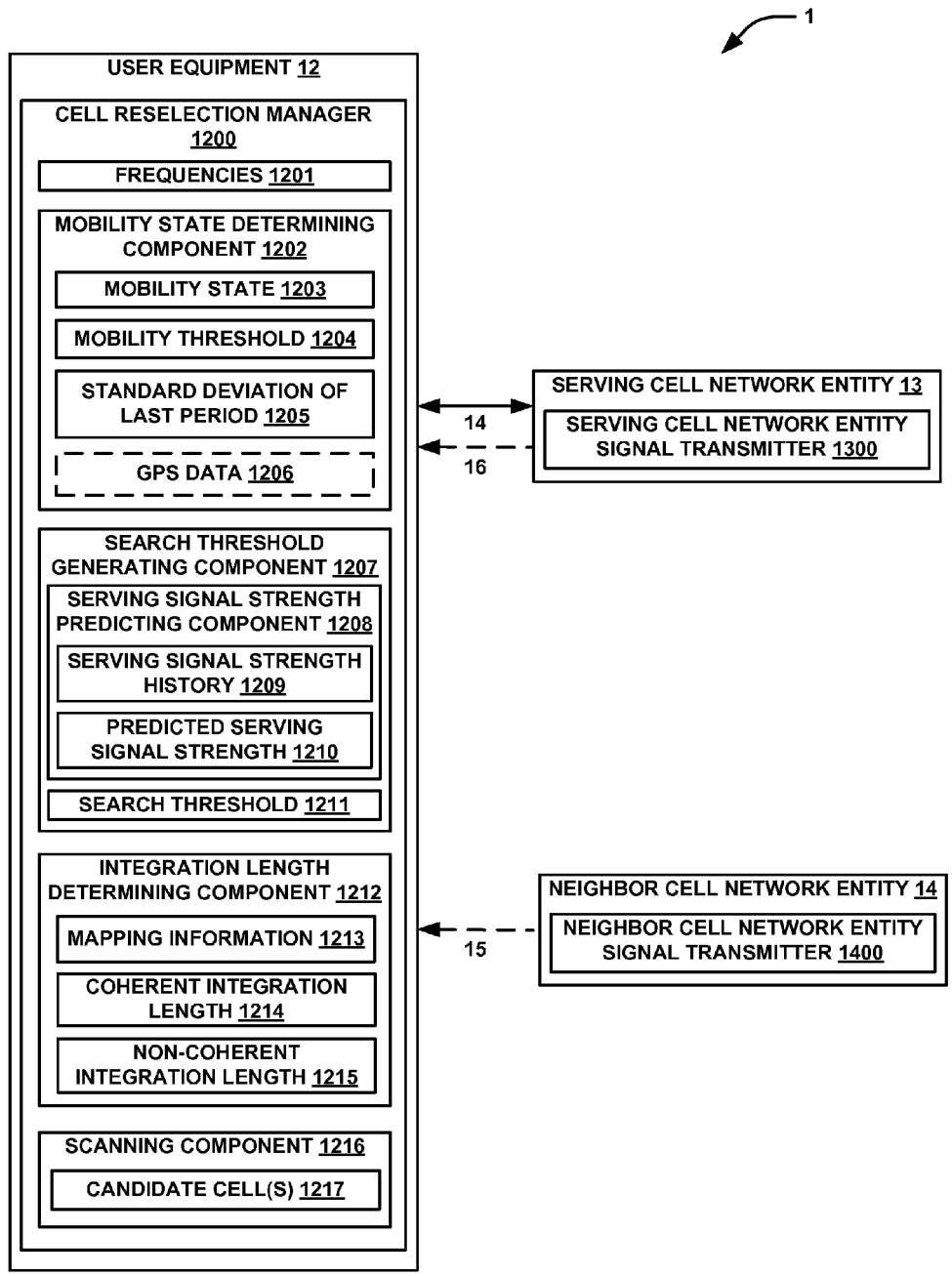
FIG. 1 is a system-level block diagram illustrating aspects of a user equipment and a network entity of the wireless system according to aspects of the present disclosure.

Referring to FIG. 1, a wireless communication system 1 is illustrated that provides for improved reselection candidate cell searching procedures. System 1 includes a UE 12 that communicates with one or more network entities, such as serving cell network entity 13, to receive wireless network access. In some examples, such communication may occur on a wireless link 14 between UE 12 and serving cell network entity 13. Alternatively or additionally, UE 12 may receive a pilot signal 15 from one or more neighbor cell network entities 14. In an aspect, pilot signal 15 may include a beacon signal, common pilot channel (CPICH), or any other pilot signal transmitted intermittently by a neighbor cell network entity 14 that indicates its presence to one or more UEs 12.

In a further aspect, serving cell network entity 13 and/or neighbor cell network entity 14 may comprise one or more of any type of network component, such as an access point, including a base station (BS) or NodeB, a relay, a peer-to-peer device, a radio network controller (RNC), an authentication, authorization and accounting (AAA) server, a mobile switching center (MSC), etc., that can enable UE 12 to communicate and/or that can establish and maintain a communication link, such as wireless link 14.

Furthermore, in an aspect, UE 12 may include a cell reselection manager 1200, which may be configured to manage cell reselection and searching procedures for UE 12. In an aspect, cell reselection manager 1200 may utilize a set of frequencies 1201 (e.g. store information identifying each of a set of frequencies 1201) over which cell searching may be conducted. In a further aspect, cell reselection manager 1200 may include a mobility state determining component 1202, which may be configured to determine and store in reselection manager 1200 a mobility state 1203 of UE 12. For example, the mobility state 1203 may represent (e.g., specify) whether UE 12 is geographically stagnant or in motion, which may be represented by specifying that the mobility state is a stationary or low mobility state or mobile state. The stationary (or low mobility) state may represent that the UE is not moving or has not moved significantly in the recent past, which may indicate that the UE is unlikely to encounter significant new neighbor cells in the short term. Alternatively, the mobile (or high mobility) state may represent a scenario where the UE is in motion and such new neighbor cells may be therefore encountered with a greater frequency.

To determine mobility state 1203, in an aspect, mobility state determining component 1202 may compute a standard deviation ($\sigma$) of a signal strength of a signal received from serving cell network entity 13 over a prior period and may compare this standard deviation to a mobility threshold 1204. This mobility threshold 1204 may be configured by the user, a manufacturer, the network, or may be dynamically altered. Furthermore, the signal strength value may be measured, for example, over the prior period, by measuring a signal-to-interference ratio (Ec/Io) and/or received signal code power (RSCP) of a signal transmitted by serving cell network entity 13 through serving cell network entity transmitter 1300. In an aspect, where the signal strength standard deviation of the last period 1205 is less than (or equal to) the mobility threshold 1204, mobility state determining component 1202 may determine that UE is in a stationary or low mobility state. Alternatively, where the signal strength standard deviation of the last period 1205 is greater than (or equal to) the mobility threshold 1204, mobility state determining component 1202 may determine that UE is in a stationary or low mobility state.

In additional or alternative examples, mobility state determining component 1202 may optionally include (e.g., store) GPS data 1206 that represents the location of the UE 12 over time and/or sensor data, which may include, but is not limited to accelerometer data. In an aspect, where mobility state determining component 1202 determines that GPS data 1206 indicates that UE 12 is moving at a rate below (or equal to) a threshold, such as, but not limited to, mobility threshold 1204, mobility state determining component 1202 may determine that UE 1202 is in a stationary or low mobility state. Alternatively, where mobility state determining component 1202 determines that GPS data 1206 indicates that UE 12 is moving at a rate greater than (or equal to) the threshold, mobility state determining component 1202 may determine that UE 1202 is in a mobile or high mobility state. In further examples, mobility state determining component 1202 may compute and analyze a number of cell reselections over a recent time period, a rate of variance of signal strength, or any other metric that may indicate the mobility of UE 12 over an immediately previous time period.

Furthermore, cell reselection manager 1200 may include a search threshold generating component 1207, which may be configured to generate a search threshold 1211 against which neighbor cell signal strength may be compared to determine whether the neighbor cell may serve as a reselection candidate for further scanning. In an aspect, search threshold generating component 1207 may generate such a threshold by first computing a future predicted serving signal strength 1210 associated with the serving cell over an immediately following time period. Such prediction may be performed by a serving signal strength predicting component 1208 and may be based on serving signal strength history 1209, which may contain (e.g., store) historical values for the serving signal strength, for example, over an immediately preceding time period. For example, where the mobility state 1203 has been determined to be a stationary or low mobility state, signal strength predicting component 1208 may equate the lowest serving signal strength over the immediately preceding time period to the predicted serving signal strength 1210. In an alternative aspect, signal strength predicting component 1208 may equate the average of the serving signal strengths over the immediately preceding time period to the predicted serving signal strength 1210. Furthermore, though the lowest serving signal strength and/or the average serving signal strength may be used to predict a future serving signal strength, other metrics may be utilized for this prediction—such as, but not limited to, any prediction based on past signal strength characteristics, UE movement characteristics, network history, network load or network load history, or any other UE or network parameter upon which future signal strength may depend or may be predicted from.

In addition, once the predicted serving signal strength 1210 over the immediately following time period has been predicted, search threshold generating component 1207 may compute a search threshold 1211, which may be, in an aspect, a step 1 search threshold.

In an additional aspect, search threshold generating component 1207 may compute a search threshold 1211, which may be a function of the predicted serving signal strength 1210. In an aspect, the search threshold 1211 will be the threshold against which neighbor cell signals obtained during a step 1 search will be compared to determine whether a step 2, 3, et seq. search will be performed to capture the neighbor cell as a candidate for reselection. In addition, in some examples, the search threshold 1211 may be set to predict serving signal strength 1210.

In other examples, for each frequency on which a full search is to be performed, search threshold 1211 (e.g. the step 1 search threshold) may simply be a function of the predicted serving signal strength 1210. In one aspect, search threshold (ST) 1211 associated with a frequency $f_1$ may be represented as:

$$ST_{f1} = SS_{predicted} + Qhyst2 - Qoffset2 + DetMargin$$

where $SS_{predicted}$ is the predicted serving cell strength 1210, Qhyst2 is a specification-defined value that biases the serving cell signal strength, Qoffset2 is a specification-defined value that biases a neighbor cell signal strength for the frequency $f_i$, and DetMargin is an additional detection margin that can be utilized to bias the search threshold, for example, conservatively or aggressively.

Furthermore, in an aspect, the predicted serving signal strength $SS_{predicted}$ may be a function of the serving signal strength history, such as the weakest serving signal strength over an immediately preceding period ($SS_{weakest,T}$) and a prediction margin applied to $SS_{weakest,T}$ to account for variations in channel conditions (PredMargin). Therefore, $SS_{predicted}$ may, in an aspect, be represented as:

$$SS_{predicted} = SS_{weakest,T} - PredMargin.$$

It follows, therefore, that search threshold 1211 may be represented as:

$$ST_{f1} = SS_{weakest,T} - PredMargin + Qhyst2 - Qoffset2 + DetMargin.$$

In an additional aspect, cell reselection manager 1200 may include an integration length determining component 1212, which may be configured to map the generated search threshold 1211 to a coherent integration length 1214 and/or a non-coherent integration length 1215 based on mapping information 1213 that may be stored by integration length determining component 1212. In a specific and non-limiting example, once the search threshold is generated by search threshold generating component 1207, integration length determining component 1212 may map the search threshold to a non-coherent integration length 1215 ($Nnc_{fi}$) associated with a frequency $f_i$.

In an aspect, mapping information 1213 may include mapping information that provides, based on at least the search threshold, the minimum integration length (e.g. coherent integration length 1214 and/or non-coherent integration length 1215) that approaches a target probability of detecting a neighbor cell with a signal strength at or greater than the search threshold 1211. As such, UE 12 can tailor the integration length to maximize power savings and reduce the time required for frequency scanning.

Furthermore, cell reselection manager 1200 may include a scanning component, which may be configured to perform frequency scanning operations for UE 12. In an aspect, cell reselection manager 1200 may perform a scan, such as a step 1 scan, utilizing the integration length mapped from search threshold 1211 for a frequency $f_1$. Scanning component 1216 may then analyze the results of the scan to determine which signals associated with neighbor cells have one or more signal peaks greater than search threshold 1211. Those cells that exhibit these signal peaks may be considered candidate cells 1217 for reselection if they pass other legacy criteria. In addition, scanning component 1216 may perform step 2, step 3, et seq. searches on these candidate cells 1217. Through such operation, UE 12 may minimize the number of cells for which the UE 12 will perform full searches, thereby reducing both power and time needed to search for reselection candidate cells.

Figure 2:
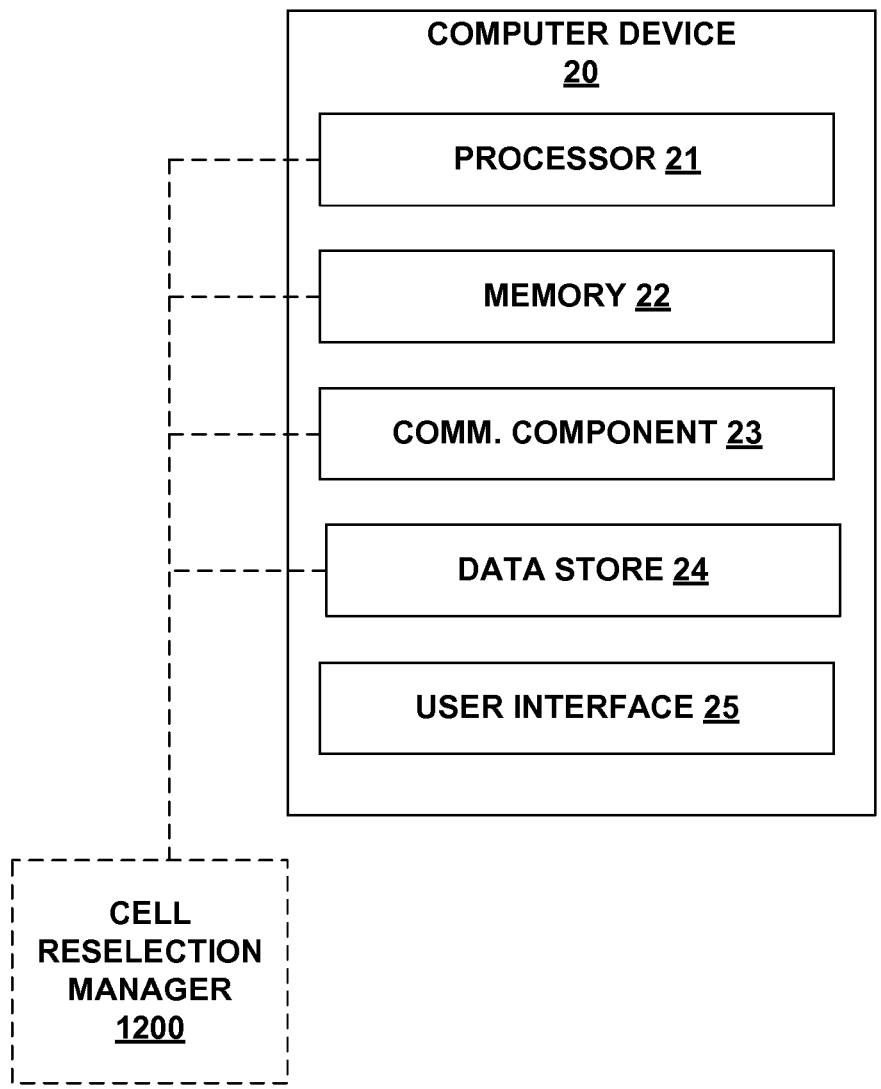
FIG. 2 is a computer device block diagram according to aspects of the present disclosure.

Referring to FIG. 2, in one aspect, any of UE 12, serving cell network entity 13, or neighbor cell network entity 14 (FIG. 1) may be represented by a specially programmed or configured computer device 20. Computer device 20 includes a processor 21 for carrying out processing functions associated with one or more of components and functions described herein. Processor 21 can include a single or multiple set of processors or multi-core processors. Moreover, processor 21 can be implemented as an integrated processing system and/or a distributed processing system.

Computer device 20 further includes a memory 22, such as for storing data used herein and/or local versions of applications being executed by processor 21. Memory 22 can include any type of memory usable by a computer, such as random access memory (RAM), read only memory (ROM), tapes, magnetic discs, optical discs, volatile memory, non-volatile memory, and any combination thereof.

Further, computer device 20 includes a communications component 23 that provides for establishing and maintaining communications with one or more parties utilizing hardware, software, and services as described herein. Communications component 23 may carry communications between components on computer device 20, as well as between computer device 20 and external devices, such as devices located across a communications network and/or devices serially or locally connected to computer device 20. For example, communications component 23 may include one or more buses, and may further include transmit chain components and receive chain components associated with a transmitter and receiver, respectively, or a transceiver, operable for interfacing with external devices. In an additional aspect, communications component 23 may be configured to receive one or more pages from one or more subscriber networks. In a further aspect, such a page may correspond to the second subscription and may be received via the first technology type communication services.

Additionally, computer device 20 may further include a data store 24, which can be any suitable combination of hardware and/or software, that provides for mass storage of information, databases, and programs employed in connection with aspects described herein. For example, data store 24 may be a data repository for applications not currently being executed by processor 21.

Computer device 20 may additionally include a user interface component 25 operable to receive inputs from a user of computer device 20, and further operable to generate outputs for presentation to the user. User interface component 25 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 25 may include one or more output devices, including but not limited to a display, a speaker, a haptic feedback mechanism, a printer, any other mechanism capable of presenting an output to a user, or any combination thereof. In an additional aspect, a user using the user interface 25 may set one of a first subscription or a second subscription as a dedicated data service (DDS) for the computer device 20.

Furthermore, in a mobile station implementation, such as for UE 12 of FIG. 1, computer device 20 may include cell reselection manager 1200, such as in specially programmed computer readable instructions or code, firmware, hardware, or some combination thereof.

Figure 3:
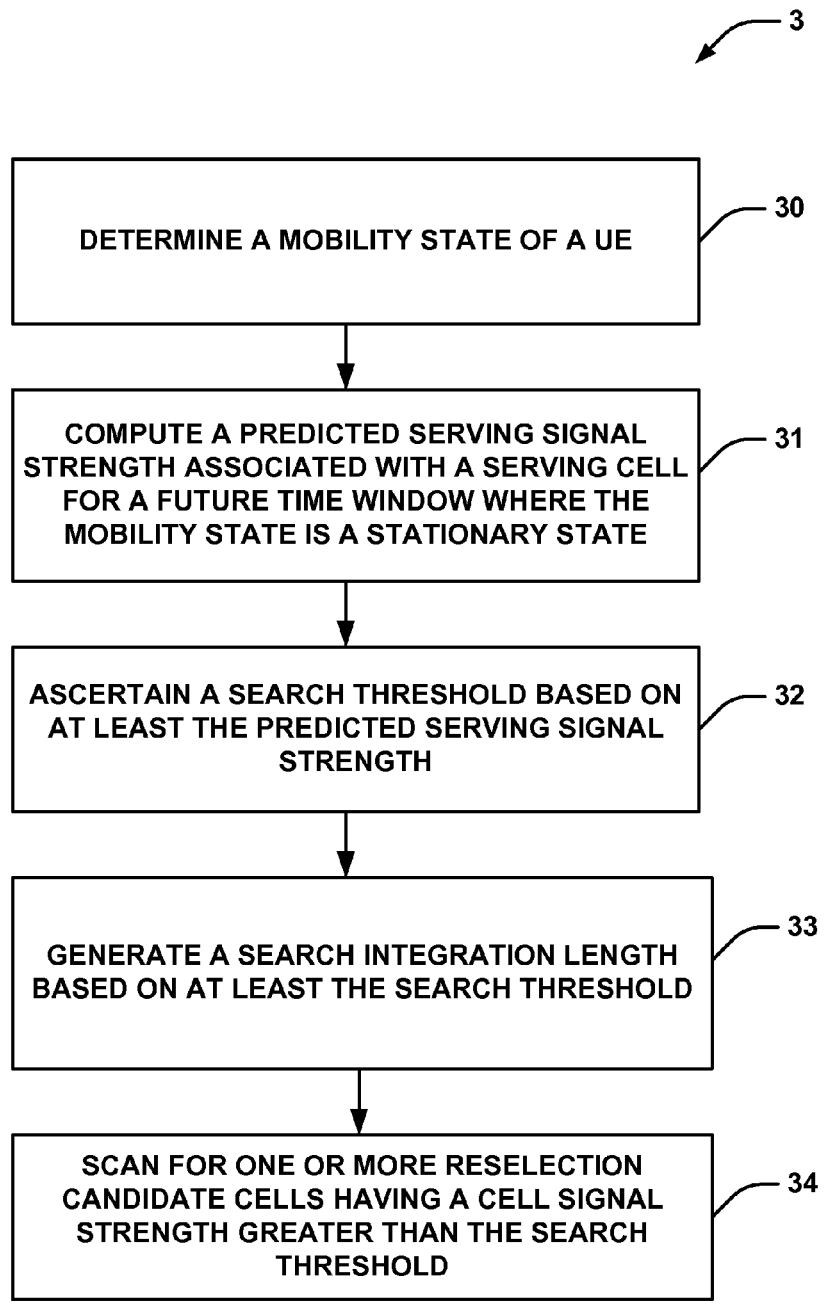
FIG. 3 is a flow diagram of an example methodology for saving power by search length reduction in a wireless user equipment according to aspects of the present disclosure.

Referring to FIG. 3, an example methodology 3 is illustrated for providing optimized candidate cell scanning in a wireless system. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments. In order to simplify explanation of the process of FIG. 3, methodology 3 will be discussed with reference to the above discussed FIG. 1 and the components and stored variables illustrated therein. It should, however, be understood that this is but one simplified example, and in other implementations other components and variables may be used to implement the exemplary methodology 3.

Turning to FIG. 3, an example methodology 3 that may be performed by a UE (e.g. UE 12 of FIG. 1) is provided. In an aspect, at block 30, mobility state determining component 12 of UE 12 may determine a mobility state 1203 of UE 12. In a non-limiting aspect, the mobility state 1203 may be determined by calculating a rate of change or serving signal strength over time, by analyzing GPS data and/or sensor data (e.g. accelerometer data), by calculating a cell reselection rate associated with the UE, and comparing any of these observed or calculated values to one or more configured threshold values. For example, in an aspect, where an RSCP or Ec/Io value fluctuates over time at a rate greater than a threshold, the UE may draw a conclusion that the fluctuation is the product of the UE moving at a high rate of speed and is therefore in a mobile or high mobility state.

In addition, where the UE determines that the mobility state 1203 of the US is a stationary or low mobility state at block 30, the serving signal strength predicting component 1208 of UE 12 may compute a predicted serving signal strength 1210 associated with a serving cell where the mobility state 1203 of the UE 12 is one of a stationary state or a low mobility state at block 31. In an aspect, the predicted serving signal strength 1210 may be, but is not limited to being, a lowest or average serving signal strength value during a future time window. In addition, this lowest or average serving signal strength value for the future time window may be computed based on a history of serving signal strengths in a past window.

In an aspect, serving signal strength predicting component 1208 of the UE 12 may predict the lowest or average serving signal strength for the future time window by setting this value to the value of the lowest or average serving signal strength in the past window. In other aspects, the UE may set the lowest or average serving signal strength of the future time window as the average of serving cell signal power over the past window. The past window duration and future time window durations may be configured by the UE, manufacturer, or the network, for example.

Additionally, at block 32, search threshold generating component 1207 of the UE 12 may ascertain a search threshold 1211 based on at least the predicted lowest or average serving signal strength computed at block 31. In an aspect, the search threshold 1211 may equal the predicted lowest or average serving signal strength, where in other aspects, the search threshold may simply be a function of the predicted lowest or average serving signal strength. During subsequent scanning, such as step 1 scanning, this search threshold will be a value against which measured signal strength from neighbor cells will be measured to determine whether the neighbor cell is a candidate for reselection and therefore whether the UE should perform a step 2 (or greater step) scan on the candidate cell.

Additionally, at block 33, integration length determining component 1212 of the UE 12 may generate a search integration length that is dependent on the search threshold. In an aspect, the search integration length may be a coherent (e.g., 1214) or non-coherent (e.g., 1215) search integration length. Additionally, the search integration length may be mapped from mapping information 1213 stored at the UE that correlates search threshold values to search integration lengths. In a further aspect, the mapping information 1213 may provide, based on at least the search threshold, the minimum integration length that approaches a target probability of detecting a neighbor cell with a signal strength at or greater than the search threshold.

Furthermore, scanning component 1216 of the UE 12 may scan for one or more reselection candidate cells 1217 having a cell signal strength greater than the search threshold at block 34. In an aspect, this scan may comprise a step 1 scan, a step 2 or subsequent step scan, both, or all steps. For example, in an aspect, the UE may perform a step 1 scan of all frequencies in which a scan is required and may compare the neighbor cell signal strengths detected during the step 1 scan to the search threshold. The UE may discard those neighbor cells that do not display at least one signal peak above the search threshold from a list of reselection candidate cells. Those neighbor cells that do display peaks above the search threshold may be considered reselection candidate cells and the UE may place these cells on the reselection candidate list and may perform step 2, step 3, or any other subsequent scans on these candidate cells. By reducing the cells to be scanned after the step 1 scan, the UE may save both time and power as compared to legacy full scans, which perform full step scanning on each neighbor cell.

Figure 4:
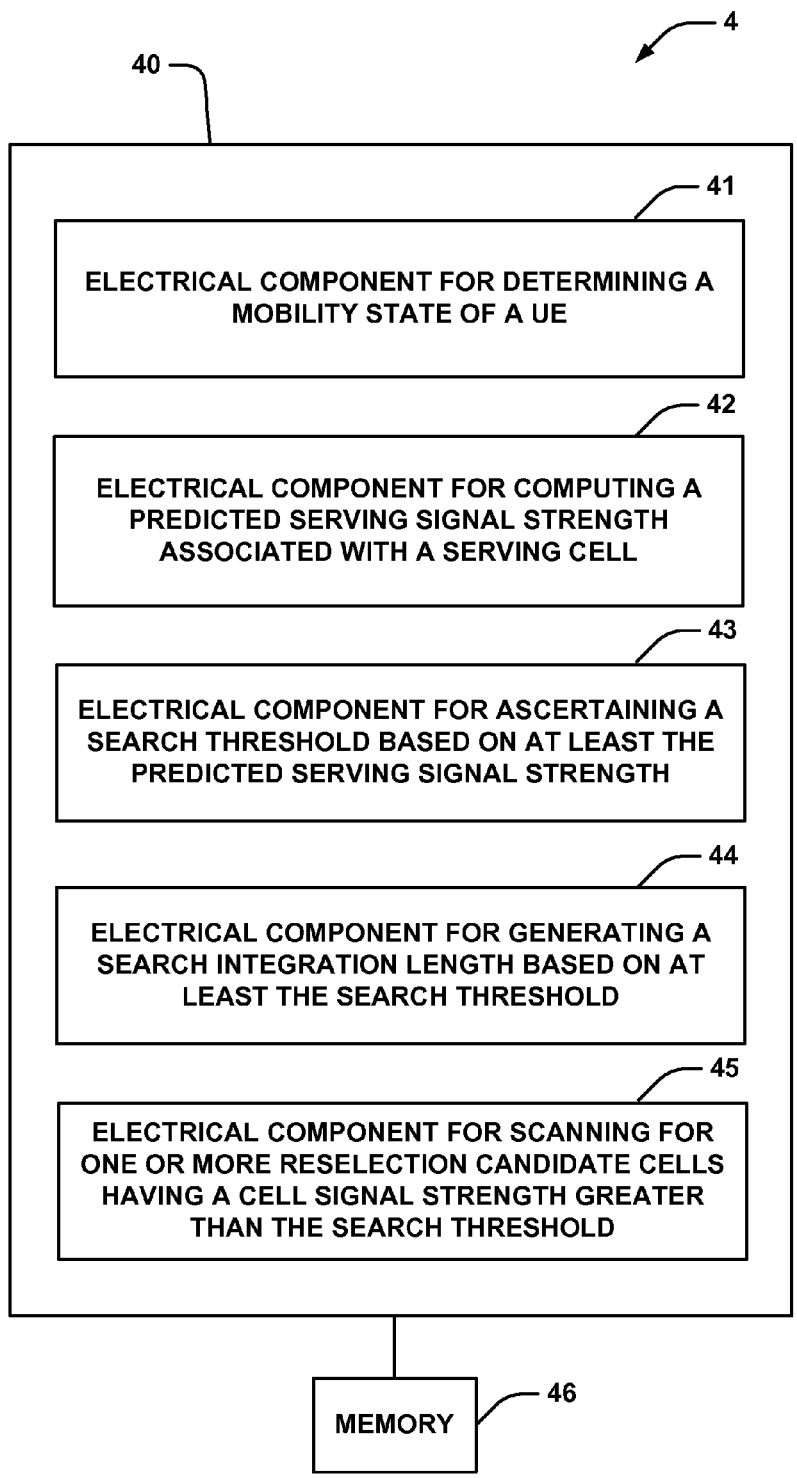
FIG. 4 is an electrical component diagram according to aspects of the present disclosure.

Referring to FIG. 4, an example system 4 is displayed for candidate cell scanning in wireless environments. For example, system 4 can reside at least partially within one or more network entities. It is to be appreciated that system 4 is represented as including functional blocks, which can be functional blocks that represent functions implemented by a processor, software, or combination thereof (e.g., firmware). System 4 includes a logical grouping 40 of electrical components that can act in conjunction. For instance, logical grouping 40 can include an electrical component 41 for determining a mobility state of a UE. In an aspect, electrical component 41 may comprise mobility state determining component 1202 (FIG. 1). In an additional aspect, logical grouping 40 can include an electrical component 42 for computing a predicted lowest or average serving signal strength associated with a serving cell, for example, for a future time window where the mobility state is a stationary or low mobility state. In an aspect, electrical component 42 may comprise serving signal strength predicting component 1208 (FIG. 1). In a further aspect, logical grouping 40 can include an electrical component 43 for ascertaining a search threshold based on at least the predicted lowest or average serving signal strength. In an aspect, electrical component 43 may comprise search threshold generating component 1207 (FIG. 1). In a further aspect, logical grouping 40 can include an electrical component 44 for generating a search integration length based on at least the search threshold. In an aspect, electrical component 44 may comprise integration length determining component 1212 (FIG. 1). Furthermore, in an aspect, logical grouping 40 can include an electrical component 45 for scanning for one or more reselection candidate cells having a cell signal strength greater than the search threshold. In an aspect, electrical component 45 may comprise scanning component 1216 (FIG. 1).

Additionally, system 4 can include a memory 46 that retains instructions for executing functions associated with the electrical components 41, 42, 43, 44, and 45, stores data used or obtained by the electrical components 41, 42, 43, 44, and 45, etc. While shown as being external to memory 46, it is to be understood that one or more of the electrical components 41, 42, 43, 44, and 45 can exist within memory 46. In one example, electrical components 41, 42, 43, 44, and 45 can comprise at least one processor, or each electrical component 41, 42, 43, 44, and 45 can be a corresponding module of at least one processor. Moreover, in an additional or alternative example, electrical components 41, 42, 43, 44, and 45 can be a computer program product including a computer readable medium, where each electrical component 41, 42, 43, 44, and 45 can be corresponding code.

Figure 5:
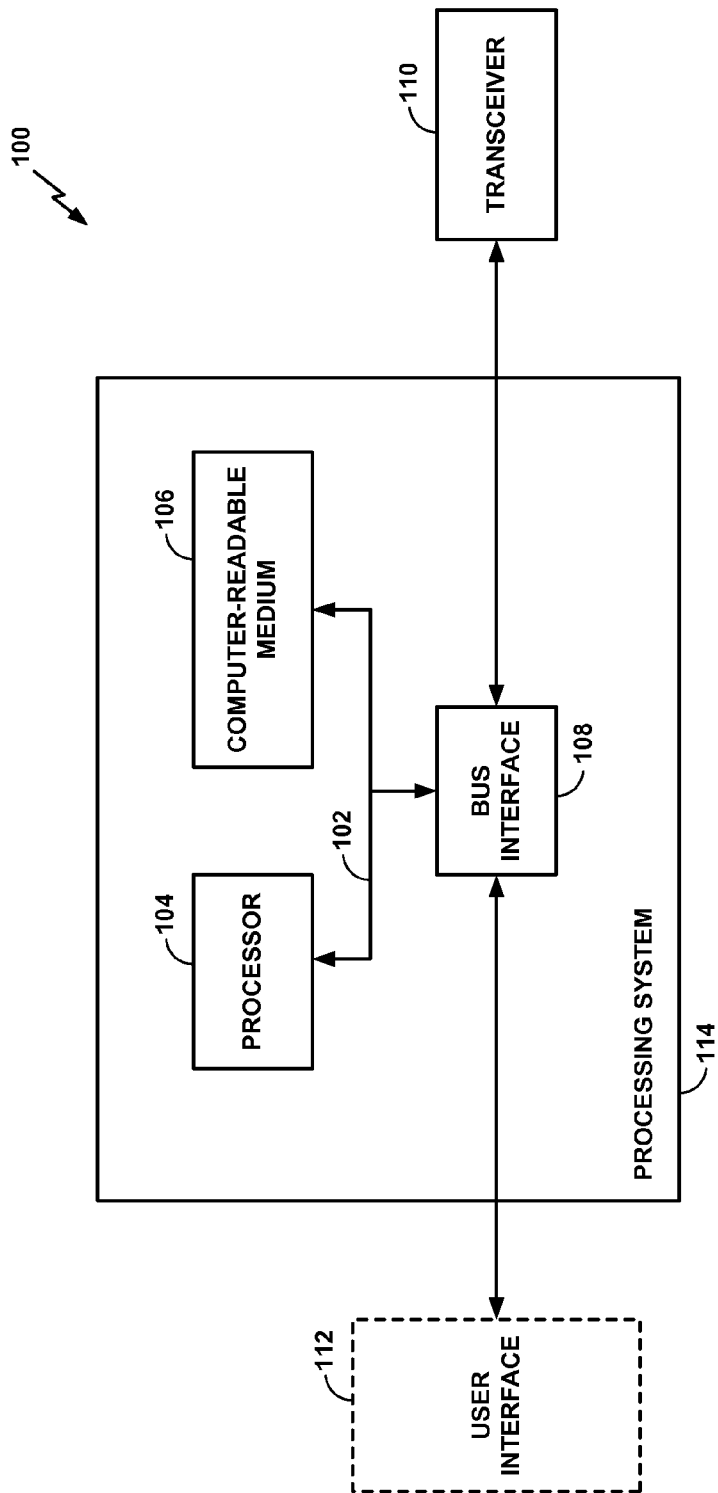
FIG. 5 is a block diagram illustrating an example of a hardware implementation for an apparatus employing a processing system.

FIG. 5 is a block diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. Furthermore, the apparatus of FIG. 5 may be one or both of UE 12 and/or network entity 13, and may be configured to provide event-based SIR target increases in a wireless system according to aspects of the present disclosure.

Figure 6:
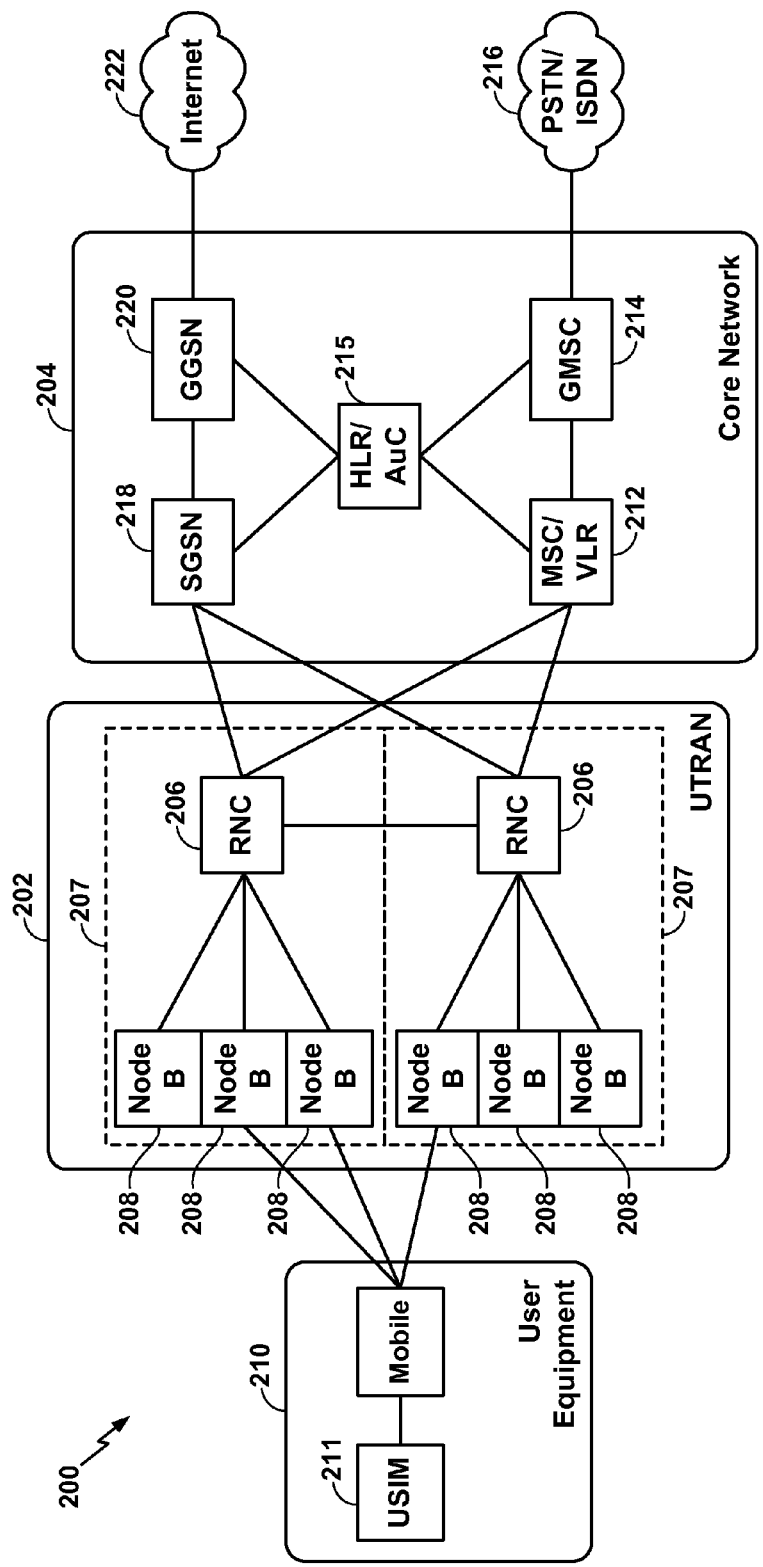
FIG. 6 is a block diagram illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. UMTS system 200 may be configured to provide event-based SIR target increases in a wireless system according to aspects of the present disclosure, and may comprise the wireless network of FIG. 1. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208, which may comprise UE 12 and network entity 13 of FIG. 1, respectively, may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210, which as noted may be mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the flow from a Node B 208 to a UE 210, and the UL, also called the reverse link, refers to the flow from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
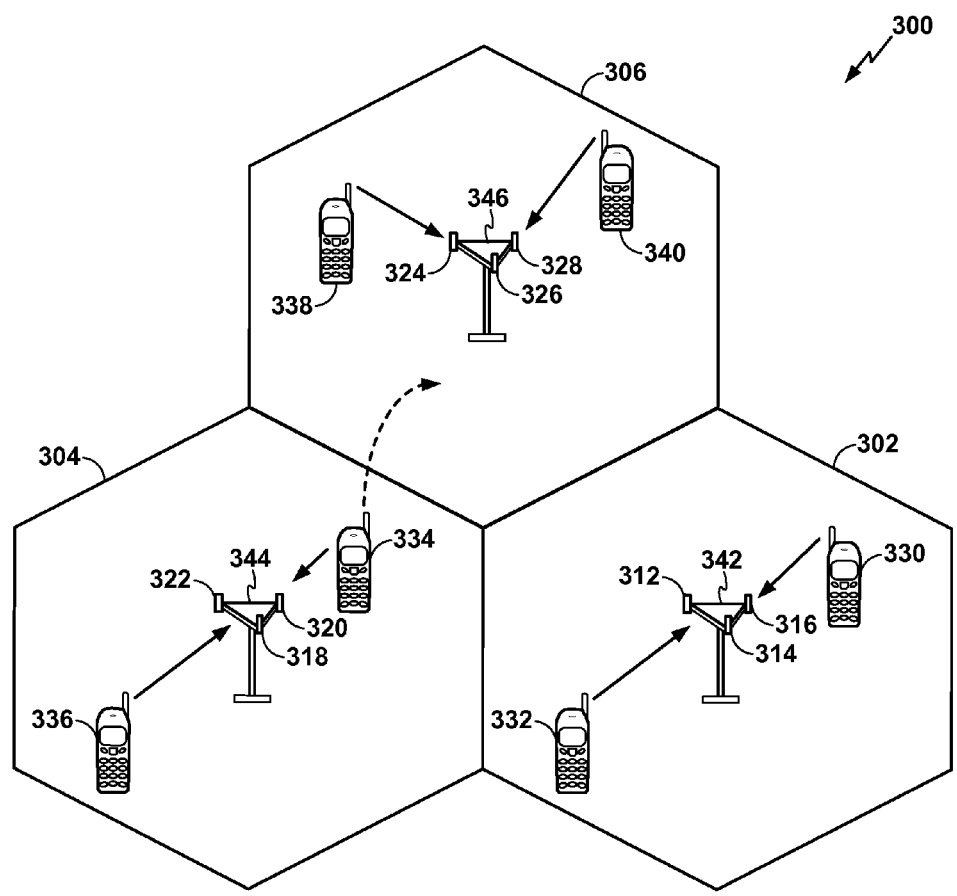
FIG. 7 is a conceptual diagram illustrating an example of an access network.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 8:
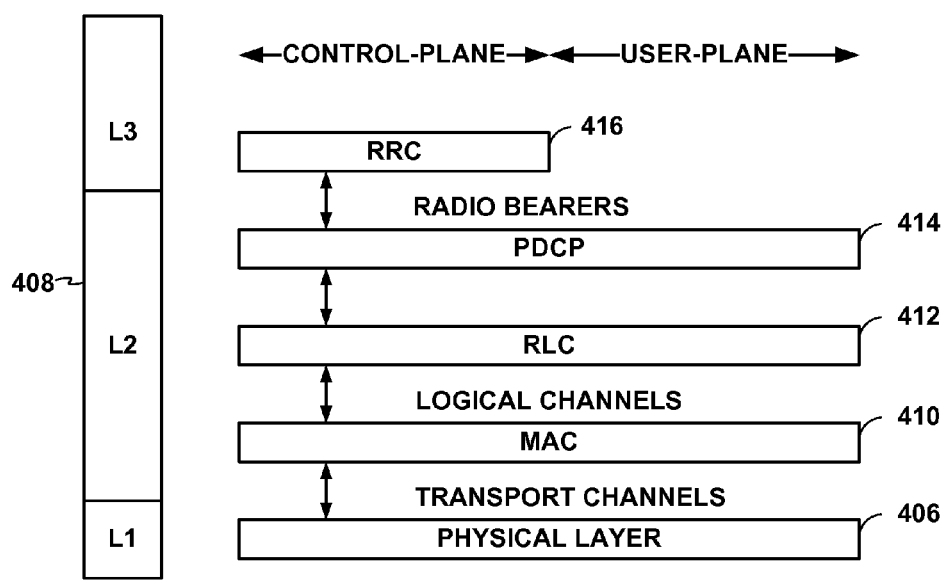
FIG. 8 is a conceptual diagram illustrating an example of a radio protocol architecture for the user and control plane.

Referring to FIG. 8, an example radio protocol architecture 400 relates to the user plane 402 and the control plane 404 of a user equipment (UE) or node B/base station. For example, architecture 400 may be included in a UE such as UE 12 (FIG. 1). The radio protocol architecture 400 for the UE and node B is shown with three transport layers: Layer 1 406, Layer 2 408, and Layer 3 410. Layer 1 406 is the lowest layer and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
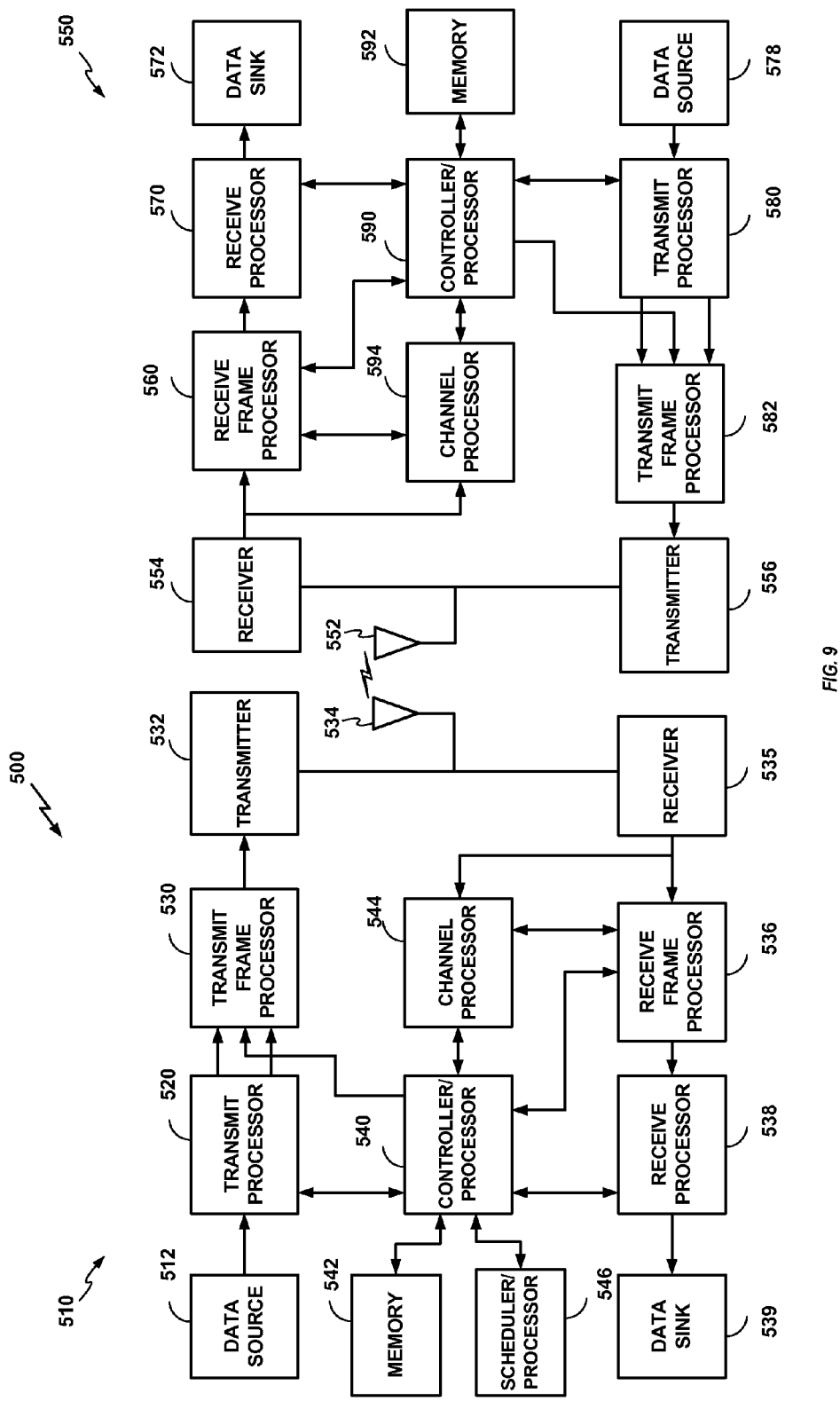
FIG. 9 is a block diagram conceptually illustrating an example of a NodeB in communication with a UE in a telecommunications system.

FIG. 9 is a block diagram of a Node B 510 in communication with a UE 550, where the Node B 510 may be the Node B 208 in FIG. 6 and/or serving cell network entity 13 and/or neighbor cell network entity 14 of FIG. 1, and the UE 550 may be the UE 210 of FIG. 6 and/or UE 12 of FIG. 1. Furthermore, in an aspect, cell reselection manager 1200 of FIGS. 1 and/or 2 may reside in one or more components of FIG. 9 (e.g., controller/processor 540 and/or 590). Additionally, one or both of controller/processor 540 and/or 590 may correspond to processor 21 of FIG. 2.

In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on at least the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    computing a predicted serving signal strength associated with a serving cell where a mobility state of a user equipment (UE) is one of a stationary state or a low mobility state, wherein the predicted serving signal strength is associated with a future time and is based on at least one serving signal strength measurement obtained over a preceding time period;
    ascertaining, by the UE, a search threshold based at least on the predicted serving signal strength;
    generating, by the UE, a non-coherent search integration length based on at least the search threshold using a mapping that maps a search threshold to an integration length that approaches a target probability of detecting a neighbor cell with a signal strength at or greater than the search threshold;
    scanning for neighbor cells using the search integration length for a step 1 search to determine one or more signal peaks;
    selecting one or more reselection candidate cells from the neighbor cells, wherein each of the one or more reselection candidate cells has a signal peak greater than the search threshold; and
    performing a step 2 or step 3 search on the one or more reselection candidate cells.

2. The method of claim 1, further comprising determining the mobility state.

3. The method of claim 2, wherein the mobility state is determined based on a signal-to-interference ratio of a common pilot channel (CPICH) associated with the serving cell.

4. The method of claim 2, wherein the mobility state is determined based on at least one Global Positioning System (GPS) measurement.

5. The method of claim 2, wherein the mobility state is determined based on at least one sensor measurement.

6. The method of claim 5, wherein the at least one sensor measurement comprises at least one accelerometer measurement.

7. The method of claim 1, wherein the mobility state is determined based on the at least one serving signal strength measurement.

8. The method of claim 7, wherein the mobility state is determined based on a standard deviation of the at least one serving signal strength measurement.

9. The method of claim 8, wherein the mobility state is determined by comparing the standard deviation to a mobility threshold value.

10. The method of claim 1, wherein computing the predicted serving signal strength comprises:
    averaging the at least one serving signal strength measurement from the preceding time period to obtain an average serving signal strength value for the preceding time period; and
    setting the predicted serving signal strength to the average serving signal strength value.

11. The method of claim 1, wherein the predicted serving signal strength is a predicted lowest serving signal strength for the future time.

12. The method of claim 1, wherein computing the predicted serving signal strength comprises:
    obtaining the at least one serving signal strength measurement from the preceding time period to obtain an lowest serving signal strength value for the preceding time period; and
    setting the predicted serving signal strength to the lowest serving signal strength value.

13. An apparatus for wireless communication, comprising:
    at least one processor; and
    a memory coupled to the at least one processor, wherein the at least one processor is configured to:
        compute a predicted serving signal strength associated with a serving cell where a mobility state of a user equipment (UE) is one of a stationary state or a low mobility state, wherein the predicted serving signal strength is associated with a future time and is based on at least one serving signal strength measurement obtained over a preceding time period;
        ascertain, by the UE, a search threshold based at least on the predicted serving signal strength;
        generate, by the UE, a non-coherent search integration length based on at least the search threshold using a mapping that maps a search threshold to an integration length that approaches a target probability of detecting a neighbor cell with a signal strength at or greater than the search threshold;

scan for neighbor cells using the search integration length for a step 1 search to determine one or more signal peaks;

select one or more reselection candidate cells from the neighbor cells, wherein each of the one or more reselection candidate cells has a signal peak greater than the search threshold; and perform a step 2 or step 3 search on the one or more reselection candidate cells.

14. The apparatus of claim 13, wherein the at least one processor is further configured to determine the mobility state.

15. The apparatus of claim 14, wherein the mobility state is determined based on a signal-to-interference ratio of a common pilot channel (CPICH) associated with the serving cell.

16. The apparatus of claim 14, wherein the mobility state is determined based on at least one Global Positioning System (GPS) measurement or at least one sensor measurement.

17. The apparatus of claim 16, wherein the at least one sensor measurement comprises at least one accelerometer measurement.

18. The apparatus of claim 13, wherein the mobility state is determined based on the at least one serving signal strength measurement.

19. A non-transitory computer-readable medium storing computer-executable code, comprising:

code for computing a predicted serving signal strength associated with a serving cell where a mobility state of a user equipment (UE) is one of a stationary state or a low mobility state, wherein the predicted serving signal strength is associated with a future time and is based on at least one serving signal strength measurement obtained over a preceding time period;

code for ascertaining, by the UE, a search threshold based at least on the predicted serving signal strength;

code for generating, by the UE, a search integration length based on at least the search threshold using a mapping that maps a search threshold to an integration length that approaches a target probability of detecting a neighbor cell with a signal strength at or greater than the search threshold;

code for scanning for neighbor cells using the search integration length for a step 1 search to determine one or more signal peaks;

code for selecting one or more reselection candidate cells from the neighbor cells, wherein each of the one or more reselection candidate cells has a signal peak greater than the search threshold; and code for performing a step 2 or step 3 search on the one or more reselection candidate cells.

20. An apparatus for wireless communication, comprising:

means for computing a predicted serving signal strength associated with a serving cell where a mobility state of a user equipment (UE) is one of a stationary state or a low mobility state, wherein the predicted serving signal strength is associated with a future time and is based on at least one serving signal strength measurement obtained over a preceding time period;

means for ascertaining, by the UE, a search threshold based at least on the predicted serving signal strength;

means for generating, by the UE, a search integration length based on at least the search threshold using a mapping that maps a search threshold to an integration length that approaches a target probability of detecting a neighbor cell with a signal strength at or greater than the search threshold;

means for scanning for neighbor cells using the search integration length for a step 1 search to determine one or more signal peaks, and for selecting one or more reselection candidate cells from the neighbor cells, wherein each of the one or more reselection candidate cells has a signal peak greater than the search threshold; and means for performing a step 2 or step 3 search on the one or more reselection candidate cells.

21. The apparatus of claim 20, further comprising means for determining the mobility state.

22. The apparatus of claim 21, wherein the mobility state is determined based on a signal-to-interference ratio of a common pilot channel (CPICH) associated with the serving cell.

23. The apparatus of claim 20, wherein the mobility state is determined based on at least one Global Positioning System (GPS) measurement.

24. The apparatus of claim 20, wherein the mobility state is determined based on at least one sensor measurement.

25. The apparatus of claim 24, wherein the at least one sensor measurement comprises at least one accelerometer measurement.

26. The apparatus of claim 20, wherein the mobility state is determined based on the at least one serving signal strength measurement.

27. The apparatus of claim 26, wherein the mobility state is determined based on a standard deviation of the at least one serving signal strength measurement.

28. The apparatus of claim 27, wherein the mobility state is determined by comparing the standard deviation to a mobility threshold value.

29. The apparatus of claim 20, wherein the means for computing the predicted serving signal strength comprises:

means for averaging the at least one serving signal strength measurement from the preceding time period to obtain an average serving signal strength value for the preceding time period; and means for setting the predicted serving signal strength to the average serving signal strength value.

30. The apparatus of claim 20, wherein the predicted serving signal strength is a predicted lowest serving signal strength for the future time.

31. The apparatus of claim 20, wherein the means for computing the predicted serving signal strength comprises:

means for obtaining the at least one serving signal strength measurement from the preceding time period to obtain an lowest serving signal strength value for the preceding time period; and means for setting the predicted serving signal strength to the lowest serving signal strength value.

32. The method of claim 1, wherein the non-coherent integration length corresponds to a number of coherent integration correlation energies that are added up during a non-coherent integration process.

* * * * *